United States Patent
Stranberg et al.

(10) Patent No.: US 11,292,192 B2
(45) Date of Patent: Apr. 5, 2022

(54) SYSTEM FOR ADDITIVE MANUFACTURING

(71) Applicant: Continuous Composites Inc., Coeur d'Alene, ID (US)

(72) Inventors: Nathan Andrew Stranberg, Post Falls, ID (US); Andrew John Overby, Coeur d'Alene, ID (US); Colin Hugh Hambling, Medina, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 240 days.

(21) Appl. No.: 16/660,519

(22) Filed: Oct. 22, 2019

(65) Prior Publication Data
US 2020/0156318 A1     May 21, 2020

Related U.S. Application Data

(60) Provisional application No. 62/769,498, filed on Nov. 19, 2018.

(51) Int. Cl.
*B29C 64/209* (2017.01)
*B29C 64/393* (2017.01)
(Continued)

(52) U.S. Cl.
CPC .......... *B29C 64/209* (2017.08); *B29C 64/118* (2017.08); *B29C 64/321* (2017.08);
(Continued)

(58) Field of Classification Search
CPC ... B29C 64/209; B29C 64/321; B29C 64/118; B29C 64/393; B29C 64/106; B33Y 30/00
See application file for complete search history.

(56) References Cited

U.S. PATENT DOCUMENTS 3,286,305 A    11/1966   Seckel
3,809,514 A    5/1974   Nunez
(Continued)

FOREIGN PATENT DOCUMENTS

DE     4102257 A1    7/1992
EP     2589481 B1    1/2016
(Continued)

OTHER PUBLICATIONS

A. Di. Pietro & Paul Compston, Resin Hardness and interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Joseph S Del Sole
*Assistant Examiner* — Mohamed K Ahmed Ali
(74) *Attorney, Agent, or Firm* — Ryan C. Stockett

(57) ABSTRACT

A system is disclosed for additively manufacturing a composite structure. The system may include a support, a discharge head connected to and moveable by the support, a supply of reinforcement, and a rotary tensioner located between the supply and the discharge head. The rotary tensioner may be configured to impart tension to the reinforcement and to generate a signal indicative of the tension. The system may further include a drive associated with the supply, and a controller in communication with the rotary tensioner and the drive. The controller may be configured to selectively adjust a feed parameter of the drive based on the signal to maintain a desired level of tension.

20 Claims, 3 Drawing Sheets

(51) Int. Cl.
*B29C 64/321* (2017.01)
*B29C 64/118* (2017.01)
*B33Y 50/02* (2015.01)
*B33Y 30/00* (2015.01)

(52) U.S. Cl.
CPC ............ *B29C 64/393* (2017.08); *B33Y 30/00* (2014.12); *B33Y 50/02* (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Haie et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1* | 2/2017 | Evans .................. B29C 64/393 |
| 2017/0030207 A1 | 2/2017 | Kittleson |
| 2017/0036403 A1 | 2/2017 | Ruff et al. |

(56) References Cited

U.S. PATENT DOCUMENTS

| | | |
|---|---|---|
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0101286 A1* | 4/2017 | Brockman ............ B65H 59/36 |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0126652 A1* | 5/2018 | Mansson ............ B29C 67/0029 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | WO-2017085649 A1 * | 5/2017 ........... B29C 64/106 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/inylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM FOR ADDITIVE MANUFACTURING

RELATED APPLICATIONS

This application is based on and claims the benefit of priority from U.S. Provisional Application No. 62/769,498 that was filed on Nov. 19, 2018, the contents of which are expressly incorporated herein by reference.

TECHNICAL FIELD

The present disclosure relates generally to a manufacturing system and, more particularly, to a system for additively manufacturing composite structures and a method of operating the system.

BACKGROUND

Continuous fiber 3D printing (a.k.a., CF3D®) involves the use of continuous fibers that are at least partially coated with a matrix inside of a moveable print head, just prior to discharge from the print head. The matrix can be a thermoplastic, a thermoset, a powdered metal, or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space, without the need for a mold or an autoclave. An example of this technology is disclosed in U.S. Pat. No. 9,511,543 that issued to Tyler on Dec. 6, 2016 ("the '543 patent"). CF3D® may be inexpensive, fast, and efficient, as the use of autoclaves, molds, and manual labor associated with traditional composite manufacturing may be reduced or even eliminated.

Although CF3D® may be inexpensive, fast, and efficient, improvements can be made to the structure and/or operation of existing systems. For example, a strength of the resulting structure may be at least partially dependent on alignment and engagement of each of the reinforcements within the structure. Straighter fibers that are all engaged equally may result in a stronger structure. However, this can be difficult to achieve. The disclosed additive manufacturing system and method are uniquely configured to provide these improvements and/or to address other issues of the prior art.

SUMMARY

In one aspect, the present disclosure is directed to a support, a discharge head connected to and moveable by the support, a supply of reinforcement, and a rotary tensioner located between the supply and the discharge head. The rotary tensioner may be configured to impart tension to the reinforcement and to generate a signal indicative of the tension. The system may further include a drive associated with the supply, and a controller in communication with the rotary tensioner and the drive. The controller may be configured to selectively adjust a feed parameter of the drive based on the signal to maintain a desired level of tension.

In another aspect, the present disclosure is directed to a tension arrangement for use with a discharge head. The tension arrangement may include a rotary tensioner configured to generate tension within a reinforcement passing into the discharge head and to generate a signal indicative of the tension. The tension arrangement may also include a drive responsive to the signal to adjust a feed parameter of the reinforcement.

DETAILED DESCRIPTION

Figure 1:
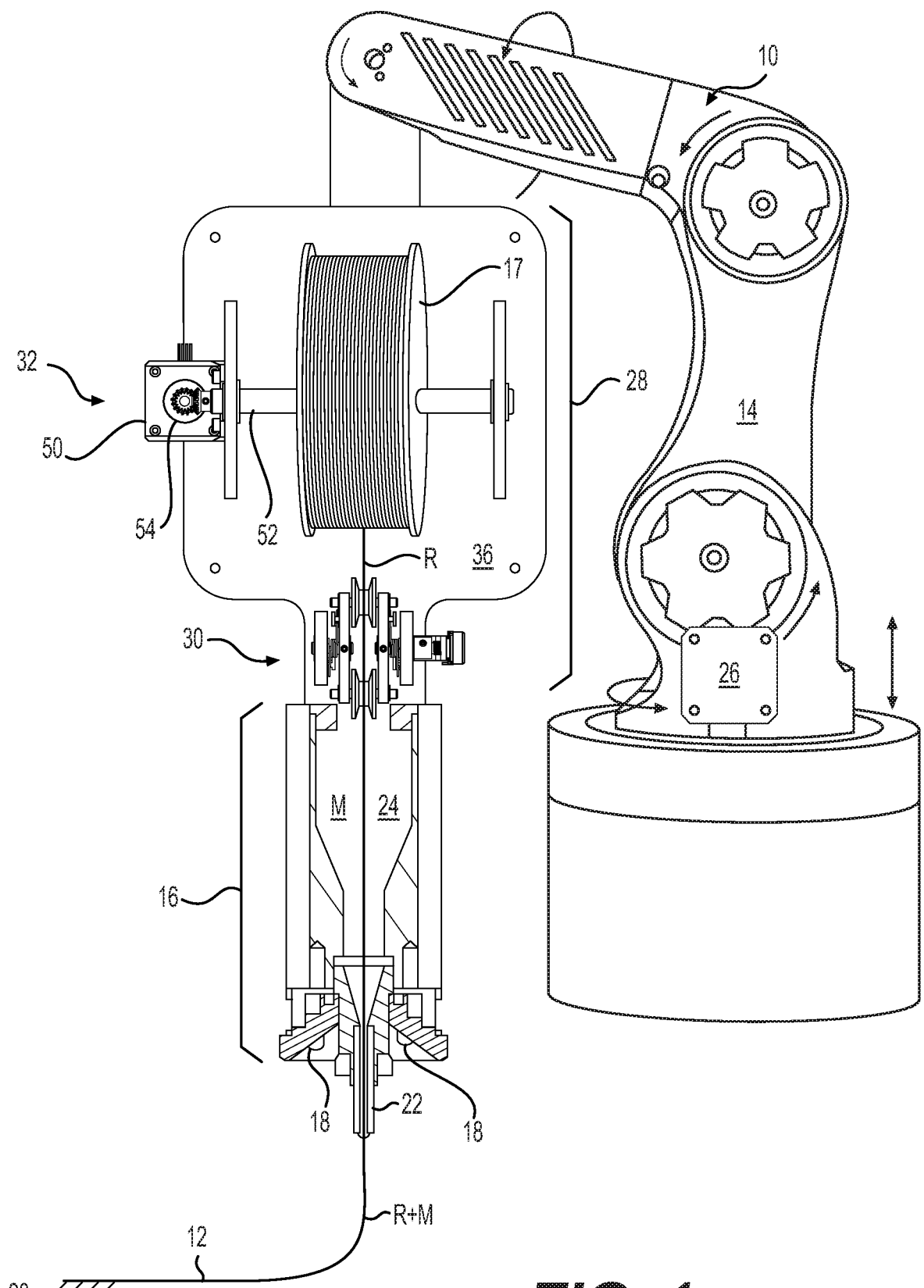
FIG. 1 is a diagrammatic and cross-sectional illustration of an exemplary disclosed additive manufacturing system.

FIG. 1 illustrates an exemplary system 10, which may be used to manufacture a composite structure 12 having any desired shape. System 10 may include a support 14 and deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an overhead bridge or single-post gantry) or a hybrid gantry/arm also capable of moving head 16 in multiple directions during fabrication of structure 12. Although support 14 is shown as being capable of 6-axis movements, it is contemplated that support 14 may be capable of moving head 16 in a different manner (e.g., along or around a greater or lesser number of axes). In some embodiments, a drive may mechanically couple head 16 to support 14, and include components that cooperate to move portions of and/or supply power or materials to head 16.

Head 16 may be configured to receive or otherwise contain a matrix (shown as M in FIG. 1). The matrix may include any type of matrix (e.g., a liquid resin, such as a zero-volatile organic compound resin, a powdered metal, etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiolenes, and more. In one embodiment, the matrix inside head 16 may be pressurized, for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R in FIG. 1). In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16 (e.g., fed from one or more spools 17). When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic wires, optical tubes, etc. It should be noted that the term "reinforcement" is meant to encompass both structural and non-structural (e.g., functional) types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix may be transported into head 16 in any manner apparent to one skilled in the art. In some embodiments, a filler material (e.g., chopped fibers, nano particles or tubes, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is completely cured before the axial growth length becomes equal to an external diameter of the matrix-coated reinforcement.

The matrix and/or reinforcement may be discharged from head 16 via at least two different modes of operation. In a first mode of operation, the matrix and/or reinforcement are extruded (e.g., pushed under pressure and/or mechanical force) from head 16 as head 16 is moved by support 14 to create features of structure 12. In a second mode of operation, at least the reinforcement is pulled from head 16 (and also from spool 17, in some embodiments), such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point 20. In particular, at the start of structure formation, a length of matrix-impregnated reinforcement may be pulled and/or pushed from head 16, deposited onto anchor point 20, and cured, such that the discharged material adheres (or is otherwise coupled) to anchor point 20. Thereafter, head 16 may be moved away from anchor point 20, and the relative movement may cause the reinforcement to be pulled from head 16. It should be noted that the movement of reinforcement through head 16 could be assisted via internal feed mechanisms, if desired. However, the discharge rate of reinforcement from head 16 may primarily be the result of relative movement between head 16 and anchor point 20, such that tension is created within the reinforcement. As discussed above, anchor point 20 could be moved away from head 16 instead of or in addition to head 16 being moved away from anchor point 20.

As can be seen in FIG. 1, head 16 may include, among other things, an outlet 22 and a matrix reservoir 24 located upstream of outlet 22. In this example, outlet 22 is a single-channel nozzle configured to discharge composite material having a generally circular, tubular, or rectangular cross-section. The configuration of head 16, however, may allow outlet 22 to be swapped out for another outlet (not shown) that discharges composite material having a different shape (e.g., a flat or sheet-like cross-section, a multi-track cross-section, etc.). Fibers, tubes, and/or other reinforcements may pass through matrix reservoir 24 and be wetted (e.g., at least partially coated and/or fully saturated) with matrix prior to discharge.

A controller 26 may be provided and communicatively coupled with support 14 and head 16. Each controller 26 may embody a single processor or multiple processors that are configured to control an operation of system 10. Controller 26 may include one or more general or special purpose processors or microprocessors. Controller 26 may further include or be associated with a memory for storing data such as, for example, design limits, performance characteristics, operational instructions, tool paths, and corresponding parameters of each component of system 10. Various other known circuits may be associated with controller 26, including power supply circuitry, signal-conditioning circuitry, solenoid driver circuitry, communication circuitry, and other appropriate circuitry. Moreover, controller 26 may be capable of communicating with other components of system 10 via wired and/or wireless transmission.

One or more maps may be stored in the memory of controller 26 and used during fabrication of structure 12. Each of these maps may include a collection of data in the form of lookup tables, graphs, and/or equations. In the disclosed embodiment, the maps may be used by controller 26 to determine the movements of head 16 required to produce desired geometry (e.g., size, shape, material composition, performance parameters, and/or contour) of structure 12, and to regulate operation of cure enhancer(s) 18 and/or other related components in coordination with the movements.

In some embodiments, a tension arrangement ("arrangement") 28 may be associated with head 16. Arrangement 28 may help to maintain a tension within individual reinforcements passing from spool 17 through outlet 22. This may help system 10 to produce structures 12 having predictable performance and to avoid malfunctions during printing (particularly when changing print directions and/or orientations). For example, when some reinforcements are in greater tension than other reinforcements in the same structure, the higher-tension reinforcements carry more of a load placed on structure 12. These reinforcements are then at greater risk for damage and/or failure during use. Similarly, excessively high reinforcement tension inside of head 16 could cause the reinforcements to break, resulting in delayed processing and/or rejected structures 12. In contrast, reinforcements that are in low or no tension generally do not contribute to performance of the part and add only excess weight. In addition, low levels of tension could cause bunching of the reinforcements inside of head 16. Uneven levels of tension between the reinforcements can also create distortions in structure 12 during fabrication. Arrangement 28 may be beneficial to help ensure a desired and uniform level of tension within all of the reinforcements passing through head 16.

Figure 2:
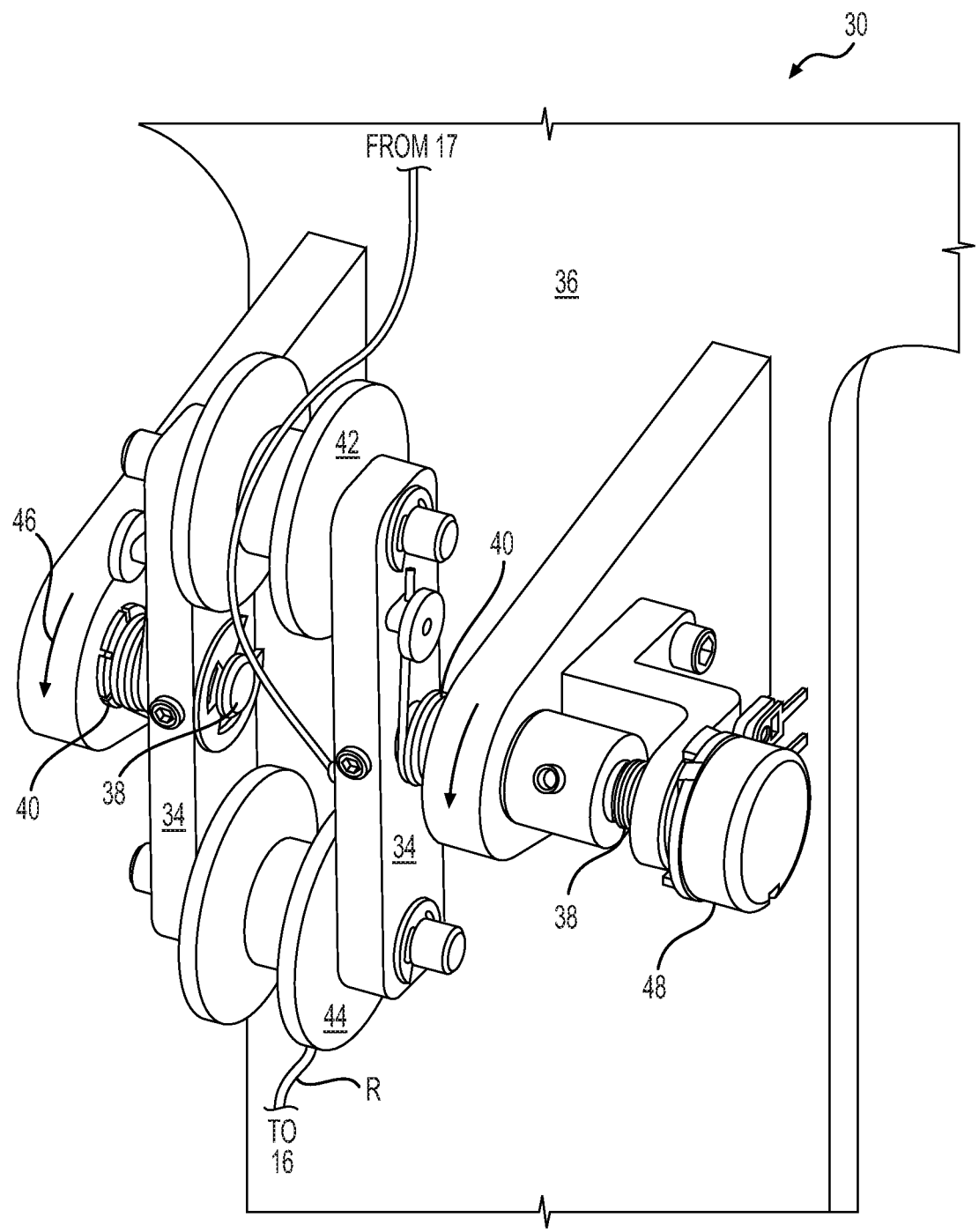
FIG. 2 is an enlarged isometric illustration of an exemplary portion of the additive manufacturing system of FIG. 1.
Figure 3:
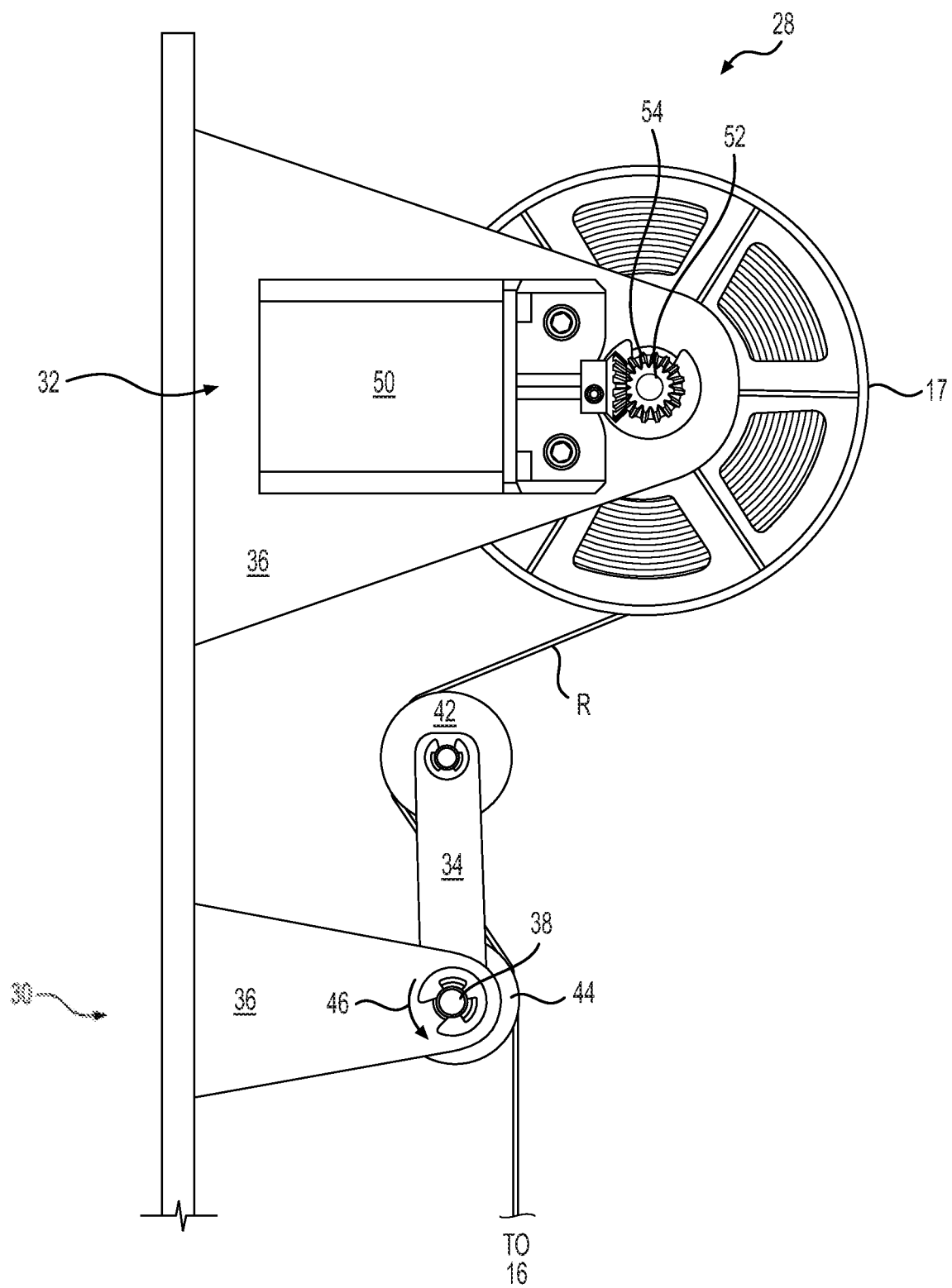
FIG. 3 is a side-view illustration of an alternative exemplary portion of the additive manufacturing system of FIG. 1.

In the embodiments of FIGS. 1, 2, and 3, arrangement 28 is illustrated as a rotary-type of arrangement, including a tensioner 30 located between spool 17 and outlet 22, and a variable drive 32 associated with spool 17. As shown in FIGS. 2 and 3, tensioner 30 may be an assembly of components including, among other things, one or more arms (e.g., spaced apart elongated plates) 34 that are pivotally connected to a bracket 36 by way of one or more axels 38. In one embodiment, outlet 22 and/or spool 17 are mounted to the same bracket 36. One or more springs (e.g., coil springs) 40 may be disposed between arms 34 and bracket 36 to bias arms 34 away from a neutral rotational angle (shown in FIG. 2). Any number of pulleys or rollers (e.g., an upstream pulley 42 and a downstream pulley 44) may be mounted to arms 34 (e.g., at opposing ends thereof), and the reinforcements from spool 17 may pass around pulleys 42, 44. When arms 34 are at the neutral rotational angle, the reinforcements may follow a straightest trajectory around pulleys 42, 44, from spool 17 through outlet 22. As spring(s) 40 pivots arms 34 away from the neutral rotational angle (e.g., in the direction of an arrow 46), the reinforcements may be moved into more of an S-shaped trajectory. As tension within the reinforcements increases, arms 34 may be pivoted against the bias of spring(s) 40 back towards the neutral position.

In some embodiments, the pivoting of arms 34 may be detected by a sensor 48. In one embodiment, sensor 48 is a rotary encoder that generates a signal indicative of the pivoting of arms 34 relative to the neutral rotational angle. In other embodiments, however, sensor 48 may be another type of sensor (e.g., a linear sensor associated with spring(s) 40, a potentiometer, etc.), if desired.

The signals generated by sensor 48 may be used (e.g., by controller 26) to selectively energize drive 32 (referring to FIG. 1). For example, in response to a signal indicating a greater amount of tension (e.g., greater rotation toward the neutral rotational angle), controller 26 may energize drive 32 a greater amount to cause more reinforcement to be dispensed and/or dispensed at a faster rate, thereby lowering the tension within the reinforcements. In contrast, in response to a signal indicating a lesser amount of tension (e.g., greater rotation away from the neutral rotational angle), controller 26 may energize drive 32 a lesser amount to cause less reinforcement to be dispensed and/or dispensed at a slower rate, thereby increasing the tension with the reinforcements. In this manner, reinforcement may be dispensed on an as-needed basis in order to maintain a desired and relatively consistent level of tension within all of the reinforcements. In one embodiment, arrangement 28 may maintain a tension within the reinforcements of less than about 5 lbs., with a resolution of about 0.1-2 lbs.

Drive 32 may embody any type of automated spool driver known in the art. In one example, drive 32 includes a motor 50 operatively connected to a shaft 52 on which spool 17 may be mounted. In the disclosed embodiment, motor 50 is connected to shaft 52 via a gear mechanism (e.g., a pair of meshed bevel gears) 54. Based on a command from controller 26, motor 50 may selectively dispense an amount of reinforcement and/or reinforcement at a commanded rate.

FIG. 3 illustrates an alternative embodiment of tensioner 30. Tensioner 30 of FIGS. 2 and 3 differ primarily in the way that axel 38 connects arms 34 to bracket 36. In particular, axel 38 of FIG. 2 may actually be divided into two stub-axels, one associated with an opposing ear tab of bracket 36 and each of arms 34. In addition, the pivot point of arms 34 may be generally centered between their opposing ends in FIG. 2. Axel 38 of FIG. 3, however, may embody a monolithic component that passes completely through a common end of arms 34 and both ear tabs of bracket 36. The design of FIG. 3 may help to reduce tolerance stack-up associated with tensioner 30 and also provide a consistent guide point for reinforcement entering head 16 (i.e., downstream pulley 44 remains stationary in FIG. 3, allowing for less movement of the reinforcement within head 16 due to changes in tension).

INDUSTRIAL APPLICABILITY

The disclosed system may be used to manufacture composite structures having any desired cross-sectional shape and length. The composite structures may include any number of different continuous fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 26 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), functional requirements, matrix specifications (e.g., cure parameters), reinforcement specifications (e.g., desired tension levels), etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

To install unimpregnated reinforcements into head 16, individual fibers, tows, and/or ribbons may be passed from spool 17 through tensioner 30 (e.g., between pulleys 42, 44), through matrix reservoir 24, through outlet 22, and past cure enhancer(s) 18. In some embodiments, the reinforcements may also need to be connected to a pulling machine (not shown) and/or to a mounting fixture (e.g., to anchor point 20). Installation of the matrix may include filling head 16 (e.g., reservoir 24) and/or coupling of an extruder or other source of pressurized matrix (not shown) to head 16.

The component information may then be used to control operation of system 10. For example, the in-situ wetted reinforcements may be pulled and/or pushed from head(s) 16 as support 14 selectively moves (e.g., based on known kinematics of support 14 and/or known geometry of structure 12) such that the resulting structure 12 is fabricated as desired. Operating parameters of cure enhancer(s) 18, arrangement 28 (e.g., tensioner 30 and/or drive 32) and/or other components of system 10 may be adjusted in real time during material discharge to provide for desired bonding, strength, and other characteristics of structure 12. Once structure 12 has grown to a desired length, structure 12 may be severed from system 10.

It will be apparent to those skilled in the art that various modifications and variations can be made to the disclosed system and methods. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A system for additively manufacturing a composite structure, comprising:
   a support;
   a discharge head connected to and moveable by the support;
   a supply of reinforcement;
   a tensioner located between the supply and the discharge head, the tensioner including:
      an arm pivotably connected to the discharge head, and
      a spring connected to the arm, the spring being configured to bias the arm to impart tension to the reinforcement;
   a sensor configured to generate a signal indicative of an orientation of the arm;
   a drive associated with the supply; and
   a controller in communication with the tensioner, the sensor, and the drive, the controller being configured to selectively adjust a feed parameter of the drive based on the signal.

2. The system of claim 1, further including a bracket connecting the discharge head and at least one of the tensioner or the drive to the support.

3. The system of claim 2, wherein the supply is connected to the bracket via the drive.

4. The system of claim 1, wherein the signal is indicative of a pivot angle of the arm.

5. The system of claim 1, further including:
   a first device located at a first end of the arm, the first device redirecting the reinforcement and
   a second device located at a second end of the arm, the second device redirecting the reinforcement.

6. The system of claim 5, wherein a pivot point of the arm is concentric with the second device.

7. The system of claim 1, wherein:
   the supply is a spool; and
   the drive includes a motor operatively connected to the spool.

8. The system of claim 1, wherein the discharge head includes a matrix reservoir configured to receive reinforcement from the tensioner and to wet the reinforcement with a matrix.

9. The system of claim 8, wherein the reinforcement is pulled through the tensioner and the matrix reservoir by movement of the discharge head away from an anchor point.

10. The system of claim 8, wherein the discharge head includes a cure enhancer configured to expose the wetted reinforcement to cure energy at a discharge location of the discharge head.

11. A system for additively manufacturing a composite structure, comprising:
    a support;
    a discharge head connected to and moveable by the support;
    a supply of material;
    a rotary tensioner located between the supply and the discharge head, the rotary tensioner configured to rotate to impart tension to the material, the rotary tensioner including:
       an arm,
       a redirecting device connected to an end of the arm and engaging the supply of material, and
       a spring configured to bias the arm away in a direction away from a position at which the material travels along a substantially linear path between the supply and the discharge head;
    a drive associated with the supply; and
    a controller in communication with the rotary tensioner and the drive, the controller being configured to selectively adjust a feed parameter of the drive to maintain a desired position of the rotary tensioner.

12. The system of claim 11, further including a sensor, wherein:
    the sensor is configured to generate a signal associated with an angle of the arm; and
    the controller is configured to adjust the feed parameter of the drive based on the signal.

13. The system of claim 11, wherein the material is pulled through the rotary tensioner by movement of the discharge head away from an anchor point.

14. The system of claim 11, wherein the supply and the drive are also connected to and moveable by the support.

15. The system of claim 14, wherein the rotary tensioner is also connected to and moveable by the support.

16. The system of claim 11, wherein the rotary tensioner is also connected to and moveable by the support.

17. The system of claim 11, wherein selectively adjusting the feed parameter comprises:
    increasing a rate at which the drive discharges the supply of material when a tension of the material is greater than a threshold; or
    decreasing the rate at which the drive discharges the supply of material when the tension of the material is less than the threshold.

18. The system of claim 11, wherein selectively adjusting the feed parameter comprises:
    decreasing a rate at which the drive discharges the supply of material when an angle of the arm is greater than a threshold, the angle extending from a longitudinal axis of the arm and a surface of the housing; or
    increasing the rate at which the drive discharges the supply of material when the angle of the arm is less than the threshold.

19. The system of claim 11, wherein:
    the end of the arm is a first end of the arm; and
    a second end of the arm is rotationally connected to the support, the second end being opposite the first end.

20. The system of claim 19, wherein the redirecting device is a first redirecting device, the system further including a second redirecting device connected to the arm at the second end, wherein:
    the second redirecting device is upstream of the first redirecting device; and
    the spring connects to the arm at a location that is closer to the second end than the first end.

* * * * *